United States Patent [19]

Plett

[11] 4,452,177

[45] Jun. 5, 1984

[54] VALVE FOR USE IN A SUCTION LINE

[75] Inventor: Carl E. Plett, Chino, Calif.

[73] Assignee: DEC International, Inc., Madison, Wis.

[21] Appl. No.: 411,546

[22] Filed: Aug. 25, 1982

[51] Int. Cl.³ .................................. A01J 5/08

[52] U.S. Cl. .................................. 119/14.32; 119/14.38; 119/14.47

[58] Field of Search .............. 119/14.32, 14.33, 14.34, 119/14.35, 14.36, 14.37, 14.38, 14.47, 14.48, 14.49, 14.50, 14.51, 14.52, 14.53, 14.54

[56] References Cited

U.S. PATENT DOCUMENTS 1,159,103 11/1915 Sabroe .................................. 119/14.38

FOREIGN PATENT DOCUMENTS 581910 11/1977 U.S.S.R. .................................. 119/14.47

*Primary Examiner*—Hugh R. Chamblee

*Attorney, Agent, or Firm*—Michael, Best & Friedrich

[57] ABSTRACT

A valve for use between a suction line and a casing. In one embodiment, the casing is a teat cup assembly. The valve or valve assembly comprises a valve housing connected to the outlet of a teat cup assembly. The housing includes a nipple formed in the bottom portion thereof for connection to a milk suction line. A ball member is mounted inside the valve housing and adapted to seat at the opening from the housing into the nipple when the interior of the housing is exposed to atmospheric pressure. The valve assembly further includes a plunger means slidably mounted in the wall of the valve housing, and the plunger means is adapted to slide inwardly into the valve housing when the pressure in the housing falls below atmospheric pressure. The inward movement of the plunger means is adapted to dislodge the ball member from its seated position at the nipple opening.

16 Claims, 5 Drawing Figures

12
38
10
16
54
40
14

34
39
38
28
5
5
37
36
32
56
16
54
18
50
41
46
4
52
30
40
4
48
14

30
24
16
46
38
14
20
54
26
56
22

16
32
28
18
38
44
40
30
42
34

48
46
40
14

VALVE FOR USE IN A SUCTION LINE

BACKGROUND OF THE INVENTION

This invention relates to valves used in suction lines and, more particularly, to valves used between suction lines and teat cup assemblies.

Valves have been used between a suction line and a teat cup assembly as a means for opening the suction line when the assembly is placed on a cow's teat. Valves have also been used to shut off the suction line when the assembly is no longer on the cow's teat. The following patents give examples of valves of this sort, and examples generally of ball valves.

| Patentee | U.S. Pat. No. | Issue Date |
|---|---|---|
| Ronaldson | 2,986,117 | May 30, 1961 |
| Bruun | 1,641,316 | September 6, 1927 |
| Horthy et al | 1,705,293 | March 12, 1929 |
| Henderson | 938,857 | November 2, 1909 |
| Dolonin | 3,163,394 | December 29, 1964 |
| Szwargulski | 3,520,330 | July 14, 1970 |
| Maxon | 3,550,612 | December 29, 1970 |

SUMMARY OF THE INVENTION

The principle object of this invention is to provide a valve for use between a suction line and a teat cup assembly which is simple and reliable, and which will permit a teat cup assembly to be placed on a cow's udder and used without requiring an operator to open the valve.

Another object of this invention is to provide a valve which will prohibit large amounts of air or other matter from entering a milking system and deteriorating the vacuum or suction stability of the system when the cup assembly is not on the cow's teat.

Another principle object of this invention is to provide such a valve which will generally prohibit the transfer of diseases like mastites from one cow to another, resulting from backflow of milk from one teat cup assembly to another.

For the achievement of the above and other objectives, this invention provides a valve to be used between a suction line and a casing. In one embodiment, the casing is a teat cup assembly. The valve or valve assembly comprises a valve housing connected to the outlet of a teat cup assembly. The housing includes a nipple formed in the bottom portion thereof for connection to a milk suction line. A ball member is mounted inside the valve housing and adapted to seat at the opening from the housing into the nipple when the interior of the housing is exposed to atmospheric pressure. This valve assembly further includes a plunger means slidably mounted in the wall of the valve housing, and the plunger means is adapted to slide inwardly into the valve housing when the pressure in the housing falls below atmospheric pressure. The inward movement of the plunger means is adapted to dislodge the ball member from its seated position at the nipple opening.

The invention also provides a valve comprising a ball enclosed in a hollow housing. The hollow housing includes sides spaced apart so as to generally restrict the lateral movement of the ball. The upper end of the housing is adapted to be secured to a teat cup assembly and in communication with a teat cup. The housing includes a bottom portion.

A nipple is attached to the bottom portion and in communication with the inside of the housing. One end of the nipple forms an opening in the bottom portion which provides a seat for the ball. The ball provides only a partial seal of the opening. Another end of the conduit is adapted to be connected to a suction line.

The valve also includes plunger means in the housing inclined upwardly beside the opening toward the ball when the ball is seated in the opening. The plunger means moves the ball and operates between two positions. When the pressure inside the housing is less than the pressure outside of the housing, the plunger means moves into the housing and dislodges the ball and holds the ball up away from the opening. When the inside of the housing is exposed to atmosphere, the plunger means moves out of the housing allowing the ball to seat in the opening.

DESCRIPTION OF THE PREFERRED EMBODIMENT

Figure 1:
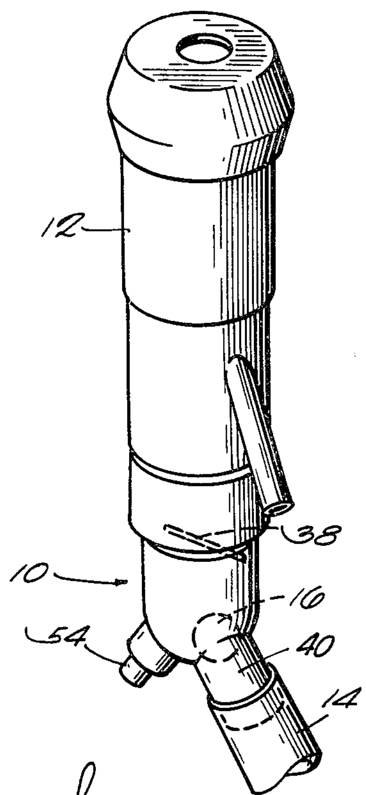
FIG. 1 is a perspective view of a teat cup assembly including a valve connected to a suction line.

With particular reference to the drawings, a valve 10 is illustrated connected between a teat cup assembly 12 and a milk suction line 14. The teat cup assembly 12 is of a conventional design, such as described in U.S. Pat. No. 4,269,143, which is incorporated herein by reference. The milk line 14 is connected to a milking claw (not shown) of any suitable design.

The valve 10 comprises a ball 16 enclosed in a hollow housing 18 made of transparent plastic. The housing includes sides 20, 22, 24 and 26 which are spaced apart so as to generally restrict lateral movement of the ball 16. The spacing between the sides 24 and 26 is about 1.3 times the diameter of the ball 16 in one lateral direction, and the spacing between the sides 20 and 22 is about 1.9 times the diameter of the ball in another lateral direction. In this embodiment, sides 24 and 26 are flat and sides 20 and 22 are curved.

The hollow housing 18 includes an open upper end 28 and a bottom portion 30. The upper end 28 is formed with an outwardly extending lip 32. Over the end of the housing is placed a threaded sleeve 34 with a bottom inwardly facing lip 36. The lip 36 on the sleeve 34 engages the lip 32 on the housing and secures the valve 10 to the teat cup assembly 12 when the sleeve 34 is threaded on the teat cup assembly 12. As the valve 10 is tighted up against the teat cup assembly 12, the upper end 28 of the housing 18 engages and secures the lower end 37 of a teat cup (not shown) against the teat cup assembly shell 39. A pin 38 is attached to the sides of the housing 18 and extends across the open upper end 28. The pin 38 keeps the ball 16 inside the hollow housing 18.

Formed in the bottom portion 30 of the housing is a nipple 40 for establishing connection of the housing interior to suction line 14. Nipple 40 extends at an angle to the vertical axis of the teat cup assembly 12.

The end 44 of the nipple forms an opening 46 in the bottom portion 30 which acts as a seat for the ball 16. When the ball 16 is seated in the opening 46, it provides a partial seal of the opening 46, because of a groove 48 extending the length of the interior surface of the nipple 40.

Figure 3:
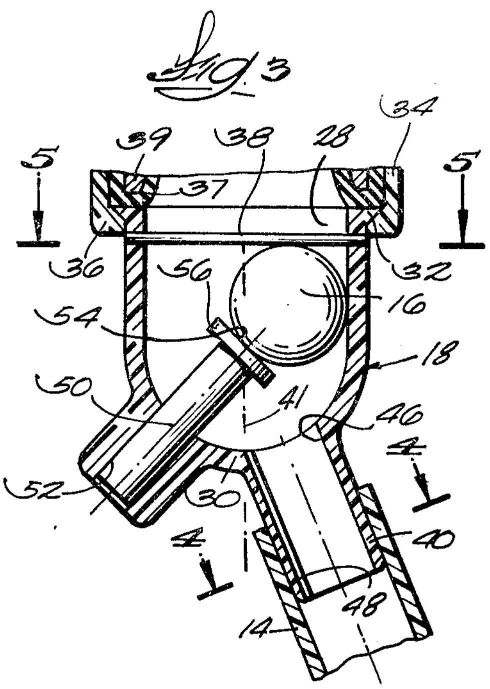
FIG. 3 is a sectional view of the valve shown in FIG. 2.
Figure 5:
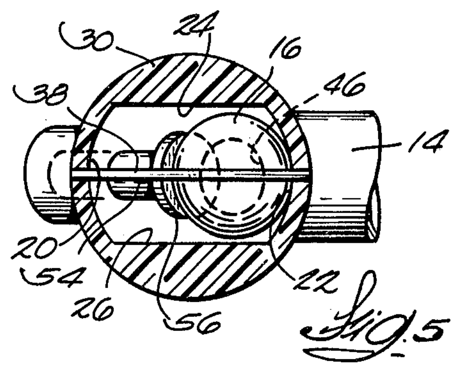
FIG. 5 is a top view of the valve taken along line 5—5 in FIG. 3.
Figure 2:
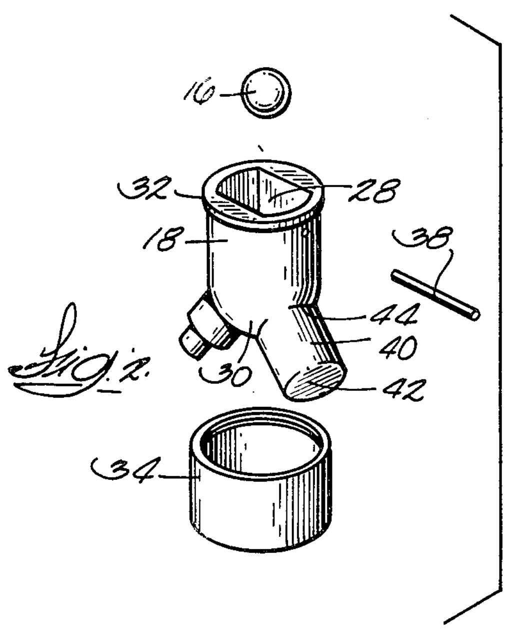
FIG. 2 is an exploded perspective view of a valve.
Figure 4:
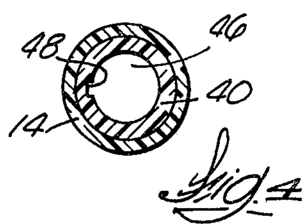
FIG. 4 is a sectional view of the valve taken along the line 4—4 in FIG. 3.

Mounted adjacent the opening 46 is a plunger 50 slidably mounted in a sleeve or bore 52 in the bottom portion 30. The plunger 50 is inclined upwardly towards the ball 16 when the ball 16 is seated in the opening 46. The end 54 of the plunger 50 inside of the housing 18 includes a rim 56 which is larger than the diameter of the bore 52 in order to retain the plunger 50 in the bore 52. The axes of the plunger 50 and the nipple 40 are in the same vertical plane, as shown in FIG. 3.

The diameter of the plunger 50 is slightly less than the diameter of the bore 52, so that when the end 54 of plunger 50 is away from the bore 52, a small amount of air enters the housing 18 around the plunger 50 and through the bore 52. In a milking operation, the slight air leakage assists the flow of milk through the valve 10.

The valve 10 is molded using conventional means, and can be assembled by placing the plunger 50 in the bore 52, and then placing the ball 16 into the hollow housing 18. The pin 38 is then secured across the open end 28 of the valve housing 18 to retain the ball 16 and the plunger 50 in the housing.

OPERATION

In operation, the teat cup assembly 12, valve 10 and milk suction line 14 are connected and then placed on the cow's udder (not shown). Since the teat cup assembly 12 is on the cow's teat and shut off from atmosphere, the slight suction leak past ball 16 through groove 48 causes a vacuum to form in housing 18. When the pressure inside the valve 10 becomes less than the pressure outside of the valve housing 18, the plunger moves into the housing 18 as a result of the pressure differential across the ends of plunger 50. The end 54 of the plunger dislodges the ball 16 from the opening 46 and lifts the ball 16 and thus fully opens the milk line 14. As milk flows through the valve 10 and milk line 14, aided by the slight air leak through the bore 52, the ball 16 remains in a raised position.

When the teat cup 12 is removed from the cow's udder, either intentionally or accidentally, atmospheric air rushes into the teat cup 12 and valve 10, thus removing the pressure differential across the plunger 50. Suction then forces the ball 16 to become seated in opening 46. The closed valve 10 then significantly reduces the suction in the teat cup assembly 12, thus reducing the likelihood of any foreign matter entering the milking system. Since the valve 10 closes before a significant amount of atmospheric air enters the milk line 14, the integrity of the milking system is maintained. For example, if one teat cup assembly 12 falls off the cow inadvertently, suction in the other teat cups will be maintained to prevent them from falling off also.

It is to be understood that the invention is not confined to the particular construction and arrangement of parts herein illustrated and described, but embraces all such modified form thereof that come within the following claims.

I claim:

1. A valve assembly for mounting in the outlet of a teat cup assembly comprising:
- a valve housing connected to the outlet of a teat cup assembly, said housing having a nipple formed in the bottom portion thereof for connection to a milk suction line;
- a ball member mounted inside said valve housing and adapted to seat at the opening from said housing into said nipple when the interior of said housing is exposed to atmospheric pressure; and
- a plunger means slidably mounted in the wall of said valve housing, said plunger means adapted to slide inwardly into said valve housing when the pressure in said housing falls below atmospheric pressure, said inward movement of said plunger means adapted to dislodge said ball member from its seated position at the nipple opening.

2. A valve assembly according to claim 1 in which the relationship between said ball member and said nipple opening on which it seats is such that there will be a small leakage path past said ball member when said ball member is seated on said nipple opening.

3. A valve assembly according to claim 1 in which said valve housing has a retainer member mounted in the upper portion thereof which serves to retain said ball member and said plunger inside said housing.

4. A valve assembly according to claim 1 in which said plunger means is comprised of a plunger member slidably mounted in an opening in the wall of said valve housing.

5. A valve assembly according to claim 4 in which said plunger member and said opening are dimensioned to provide an air leakage path through said opening around said plunger member.

6. A valve assembly according to claim 4 in which the axes of said nipple and said wall opening are at an angle with respect to the axis of the teat cup assembly.

7. A valve assembly according to claim 4 in which said plunger member has a head portion of a larger diameter then said opening on the inner end thereof.

8. A valve to be used between a suction line and a casing, said valve comprising:
- a ball,
- a hollow housing enclosing said ball, said housing including a bottom portion, sides spaced apart so as to generally restrict lateral movement of said ball, and an upper end adapted to be secured to and in communication with the casing,
- a nipple including two ends, with one end adapted to be connected to the suction line, and another end attached to said bottom portion and in communication with the inside of said housing, and forming an opening in said bottom portion on which said ball seats, said opening having a leakage path thereat to permit leakage past said ball when said ball is seated on said opening, and
- plunger means beside said opening and in said housing inclined upwardly toward said ball when said ball is seated in said opening so that, when the pressure inside said hollow housing is less than the pressure outside of said housing, said plunger means moves into said housing and dislodges said ball and holds said ball up away from said opening and, when the inside of said housing is exposed to atmosphere, said plunger means moves out of said housing allowing said ball to seat in said opening.

9. A valve according to claim 8, and further including a pin attached to said sides of said housing and extending across said upper end to secure said ball in said housing.

10. A valve according to claim 8, wherein said nipple extends laterally downward from said housing.

11. A valve according to claim 8, wherein said plunger means comprises a plunger member with an end in a bore in said bottom portion, with said end of said plunger inside said housing and having a rim with a diameter greater than the diameter of said bore.

12. A valve according to claim 11, wherein the diameter of said plunger member is less than the diameter of said bore, so that when said end of said plunger member is away from said bore, a small amount of air enters said housing through said bore and around said plunger member.

13. A valve to be used between a suction line and a teat cup assembly, said valve comprising, a ball, a hollow housing enclosing said ball and made of transparent material, said housing including a bottom portion, sides spaced apart so as to generally restrict lateral movement of said ball, an upper end adapted to be secured to and in communication with the teat cup assembly, a pin attached to said sides of said housing and extending across said upper end to secure said ball in said housing, a nipple including two ends, with one end adapted to be connected to the suction line, and another end attached to said bottom portion and in communication with the inside of said housing and forming an opening in said bottom portion on which said ball seats, said opening having a leakage path thereat to permit leakage past said ball when said ball is seated on said opening, and plunger means in said bottom portion beside said opening inclined upwardly towards said ball when said ball is seated in said opening so that, when the pressure inside said hollow housing is less than the pressure outside of said housing, said plunger means moves into said housing and dislodges said ball and holds said ball up away from said opening, and when the inside of said housing is exposed to atmosphere, said plunger means moves out of said housing allowing said ball to seat in said opening, said plunger means comprising a plunger member with an end in a bore in said bottom portion, with the diameter of said plunger member being less than the diameter of said bore and with said end of said plunger member inside said housing and having a rim with a diameter greater than the diameter of said bore, so that when said end of said plunger member is away from said bore a small amount of air enters said housing through said bore.

14. A valve according to claims 8 or 13, wherein the spacing between said sides is about 1.3 of said ball's diameter in a lateral direction and about 1.9 of said ball's diameter in a lateral direction at a right angle to said other lateral direction.

15. A valve according to claims 8, 10 or 13 wherein the axes of said nipple and said plunger means are in the same vertical plane.

16. A valve according to claims 8 or 13 wherein said opening is noncircular.

* * * * *